Figure 1:
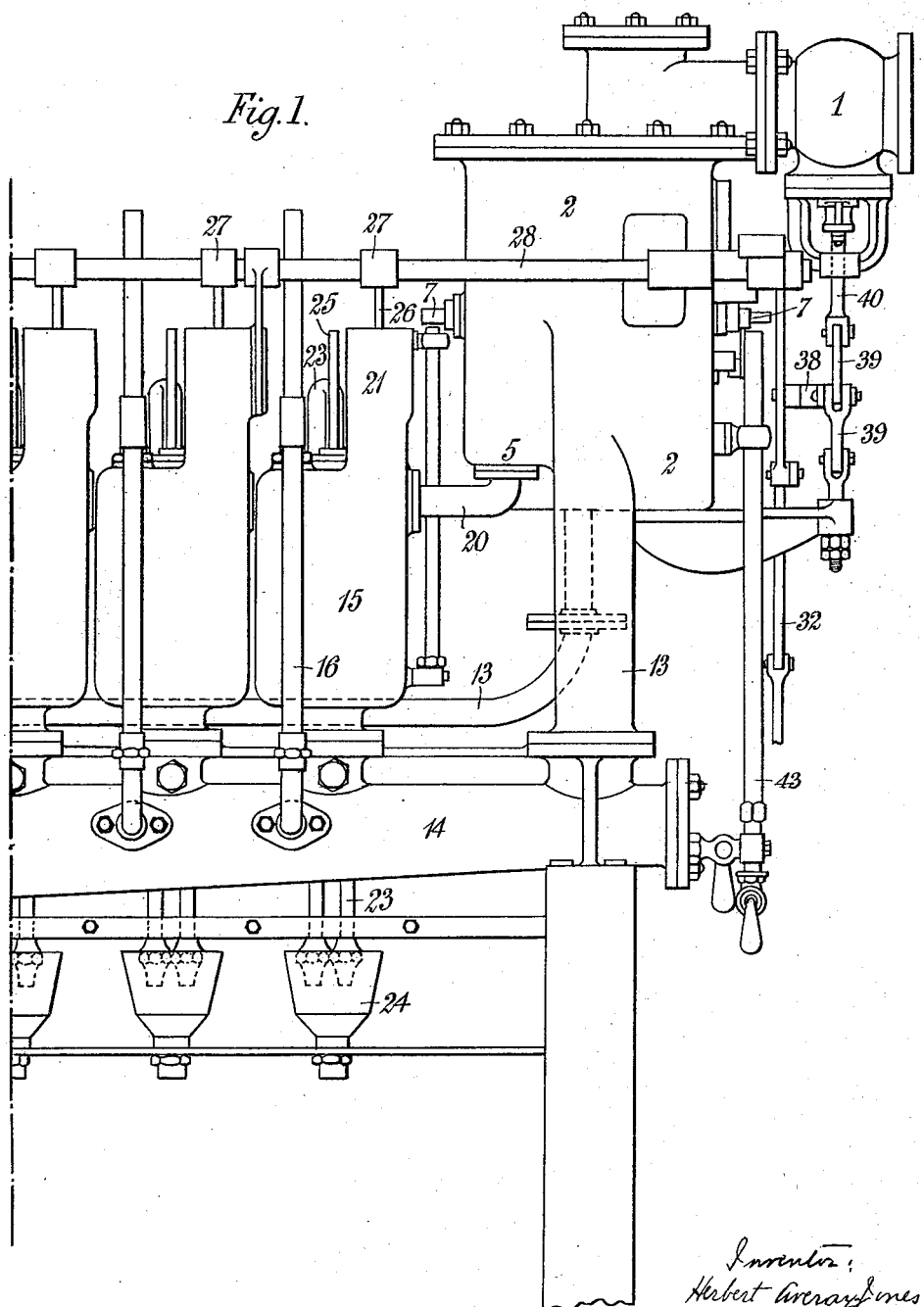

H. AVERAY-JONES.
FILLING MACHINE.
APPLICATION FILED JUNE 3, 1915.

1,191,382.

Patented July 18, 1916.
10 SHEETS—SHEET 3.

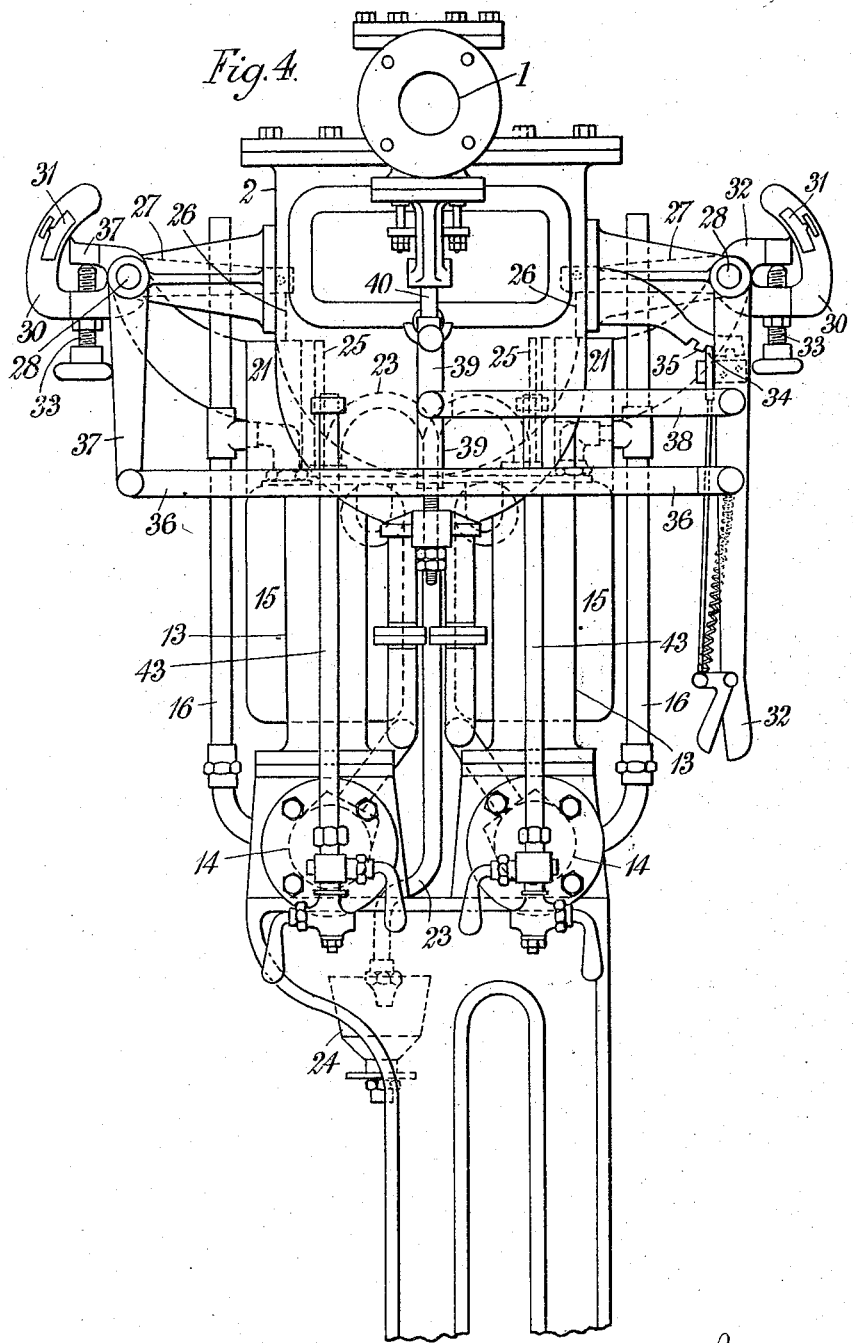

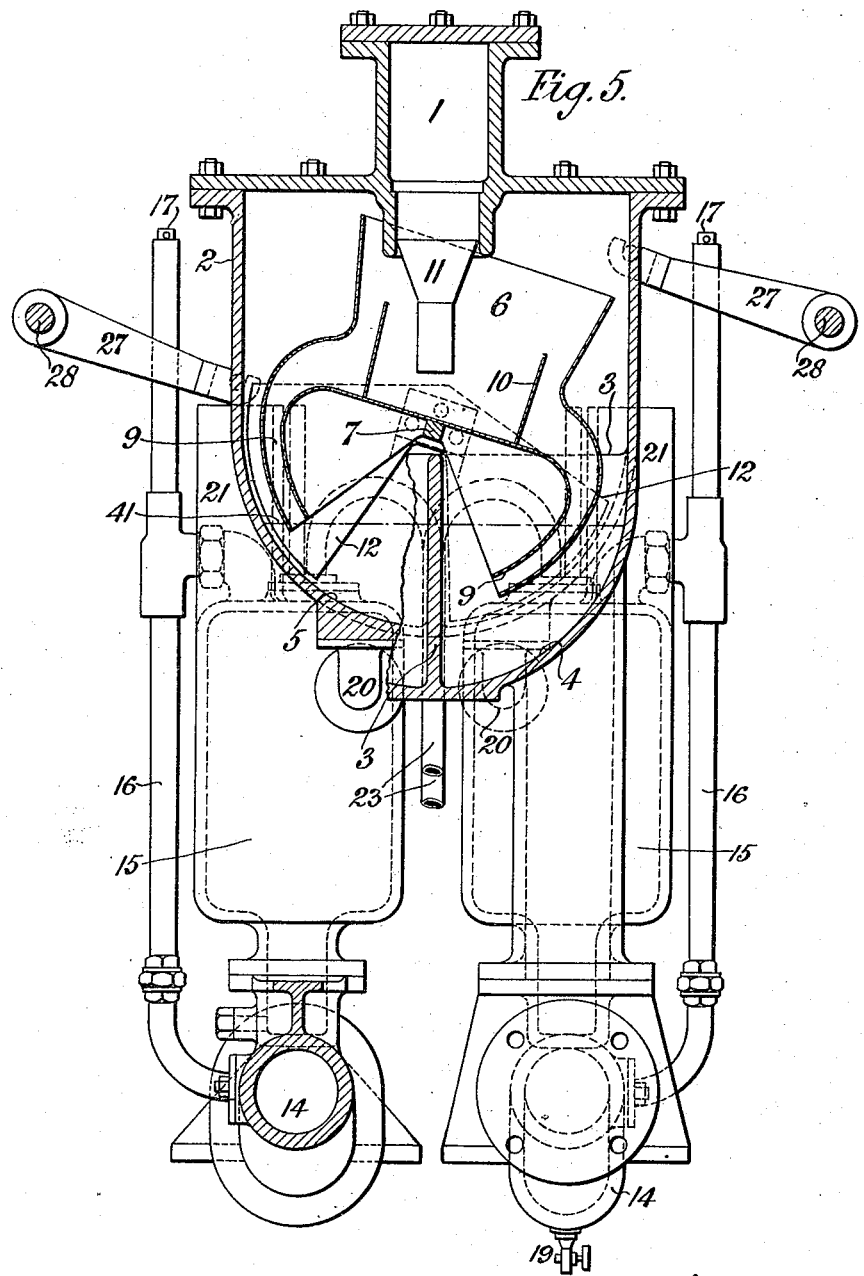

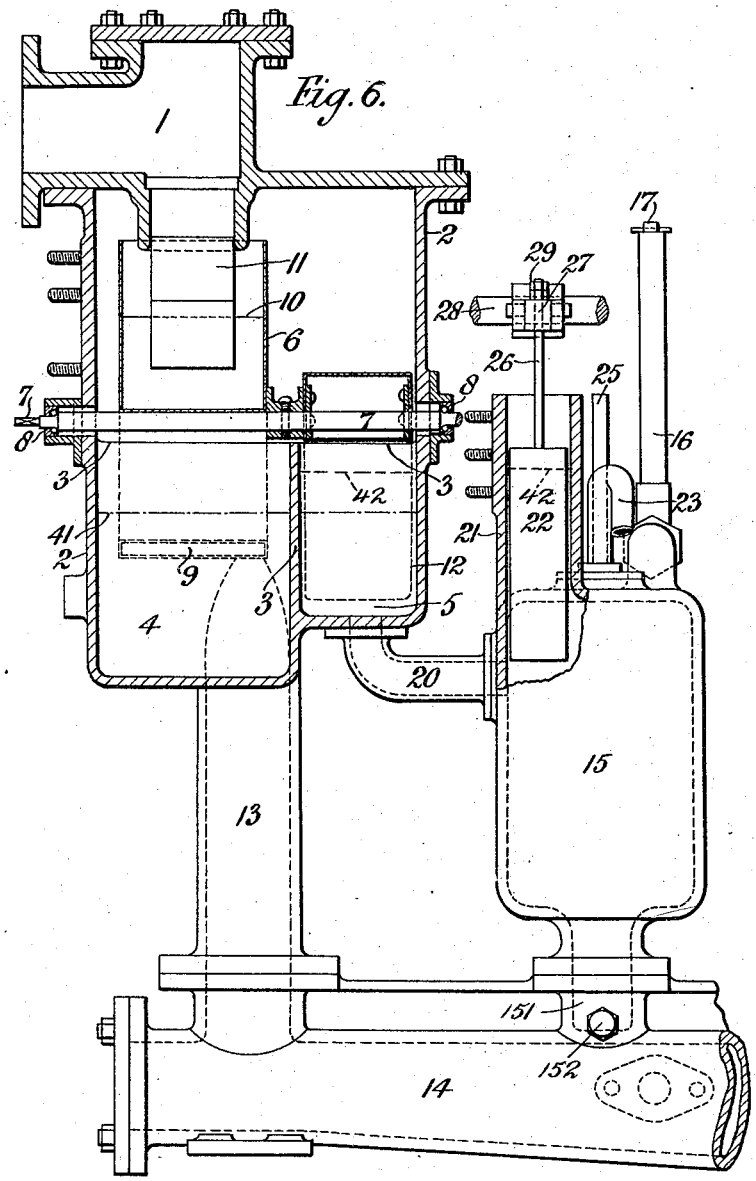

H. AVERAY-JONES.
FILLING MACHINE.
APPLICATION FILED JUNE 3, 1915.
1,191,382.
Patented July 18, 1916.
10 SHEETS—SHEET 7.
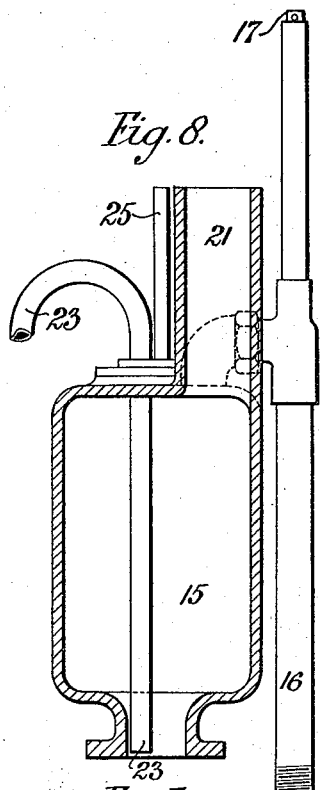
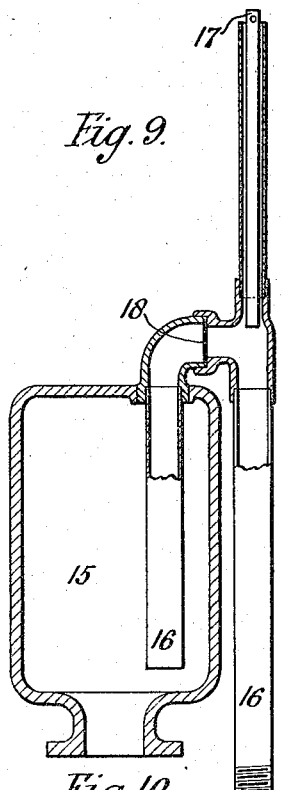
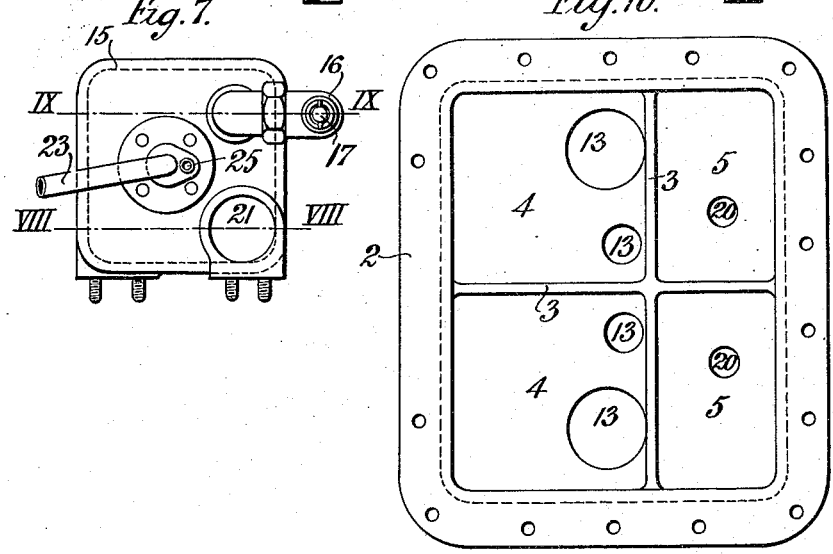

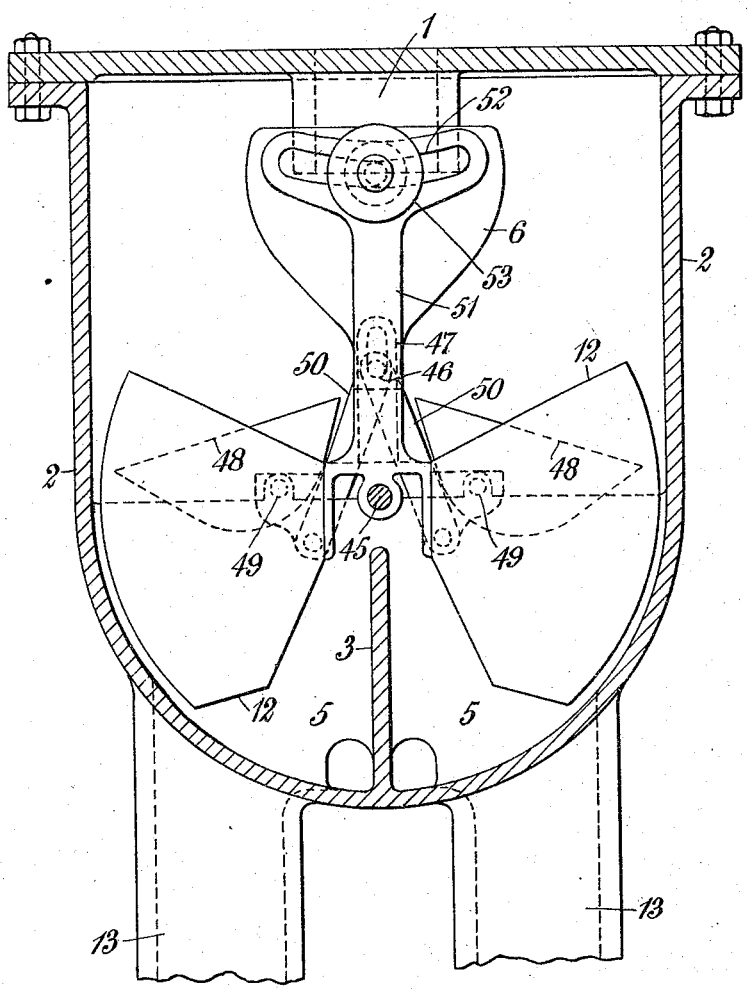

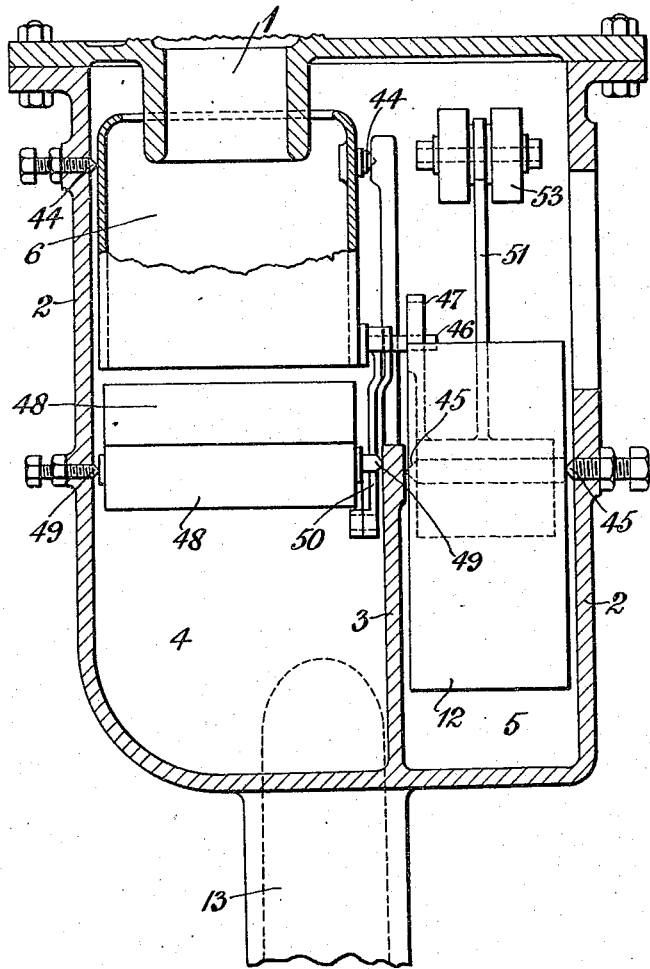

UNITED STATES PATENT OFFICE.

HERBERT AVERAY-JONES, OF FOWNHOPE, ENGLAND, ASSIGNOR OF ONE-HALF TO THE ASIATIC PETROLEUM COMPANY, LIMITED, OF LONDON, ENGLAND.

FILLING-MACHINE.

1,191,382.          Specification of Letters Patent.        Patented July 18, 1916.

Application filed June 3, 1915. Serial No. 31,968.

*To all whom it may concern:*

Be it known that I, HERBERT AVERAY-JONES, a subject of the King of Great Britain, residing at Stone House, Fownhope, in the county of Hereford, England, have invented a new and useful Filling-Machine, of which the following is a specification.

This invention relates to improvements in machines for filling vessels with liquid.

According to this invention the liquid is delivered into a chamber divided into compartments which are in communication with two measuring chambers, or preferably two series of measuring chambers. The liquid is directed into one of the compartments and thence to one series of measuring chambers and after a definite quantity of liquid has been delivered it is automatically diverted into the other compartment and thence to the other series of measuring chambers until a definite quantity of liquid has been delivered, the liquid is then automatically diverted into the first compartment and so on.

Each measuring chamber is provided with a siphon by means of which the liquid is siphoned into a vessel and mechanical or automatic means are provided for starting the siphons. When mechanical means are employed, each measuring chamber is provided with a plunger, and all the plungers of one series of measuring chambers are connected together and are lowered by the operator to start the siphons. Means are provided for adjusting the height of each plunger separately to compensate for any irregularity in the capacity of a chamber and means are also provided for altering the height of all the plungers simultaneously to compensate for differences in volume of the liquid caused by changes in temperature, a scale being provided in order that this may be readily accomplished.

If it is desired to start the siphons automatically (in which case the operation of the machine may be entirely automatic) the siphons in each series of measuring chambers are started by the upsetting of a tumbler containing a definite quantity of the liquid.

When two series of measuring chambers are employed and the machine is used for filling vessels with liquid of light specific gravity such as petrol, or benzolin, the liquid from the two compartments of the chamber already mentioned is delivered into one or other of two distributing pipes from which the measuring chambers are filled. The distributing pipes are below the measuring chambers and the bottom of each distributing pipe is curved or sloped and a cock or other means for draining off water or other impurity is provided at the lowest part of the pipe.

In order to make the entry of water or other impurity into the measuring chambers still more difficult the pipe which delivers the liquid from the distributing pipe to each measuring chamber is brought from the distributing pipe to a point above the measuring chamber and a plug or tap may be provided to drain each measuring chamber.

The mechanism for diverting the liquid from one compartment to the other consists of a funnel or chute connected with or forming part of a tipping float part of which is in one compartment and part in the other compartment of the chamber. The definite tipping movement is insured either by means of a weight, or by means of the liquid itself in which latter case the liquid is delivered into a tank forming part of the chute. This arrangement has the advantage that it is unaffected by the specific gravity of the liquid. Preferably the float and chute are mounted in bearings above the level of the liquid so as to be unaffected thereby. The vessels may conveniently be brought up to the apparatus on trucks or may be arranged on a turntable.

Figure 2:
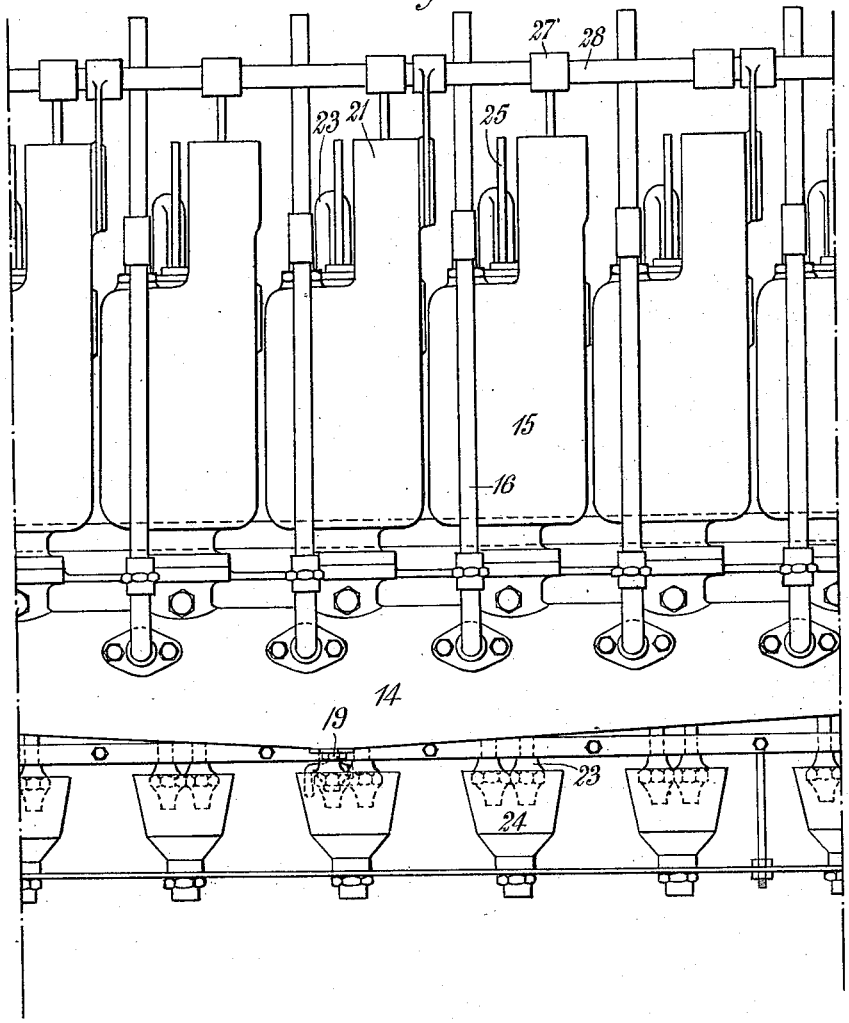
Figure 3:
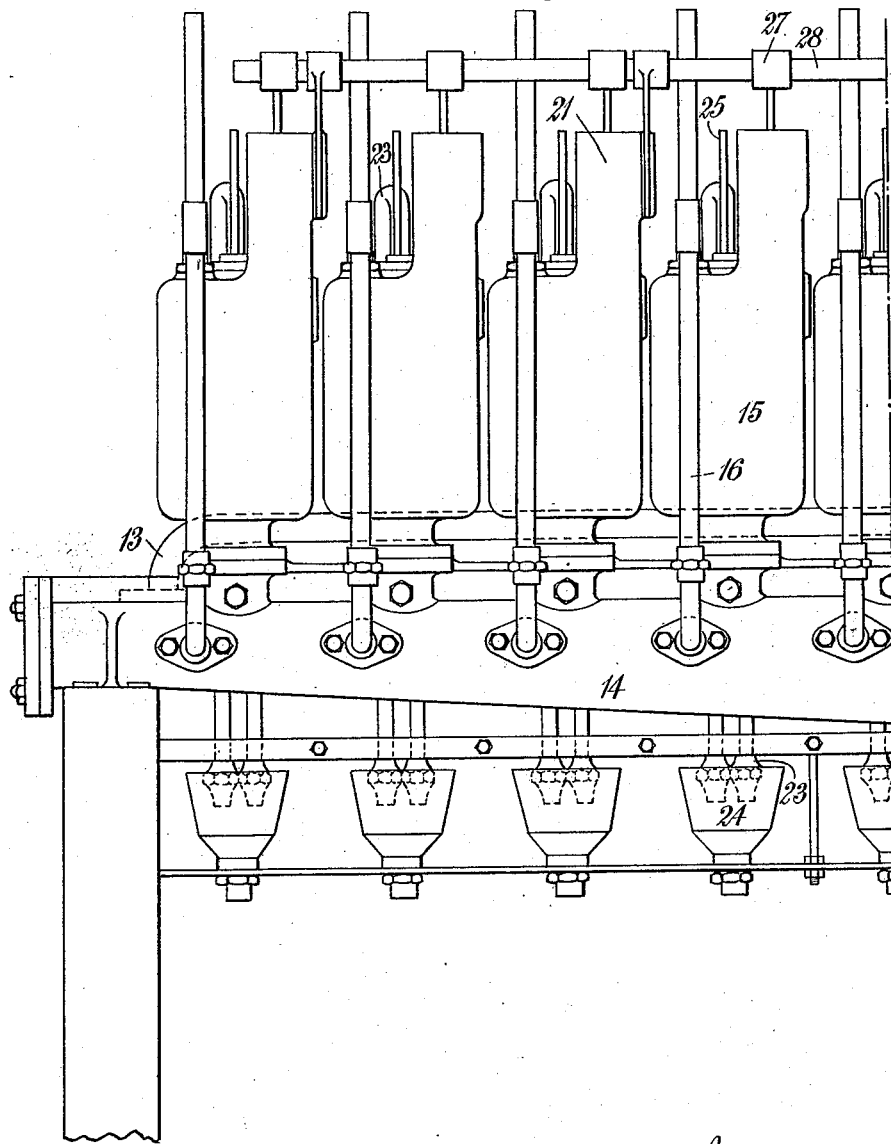
Figure 13:
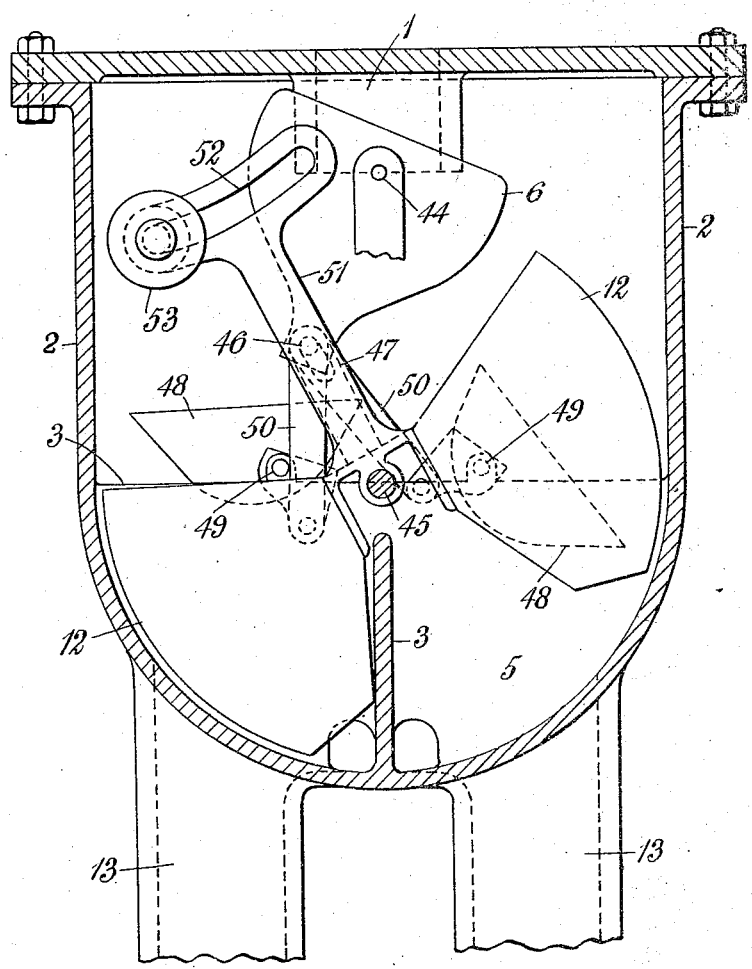

In the drawings which illustrate the invention Figures 1, 2 and 3 are a side elevation of a machine for filling twelve cans at a time. This view has been divided into three sections in order that the different parts of the machine may be shown on a suitable scale. Fig. 4 is a front view of Fig. 1. The remaining figures are all drawn to a larger scale. Fig. 5 is a transverse section through the chamber. Fig. 6 is a part longitudinal section of Figs. 4 and 5 looking from the right. Fig. 7 is a plan of a measuring chamber. Fig. 8 is a section on the line VIII—VIII, Fig. 7. Fig. 9 is a section on the line IX—IX, Fig. 7. Fig. 10 is a plan of the chamber. Figs. 11 and 12 are sections at right angles showing the modification in which the siphon action is started by the upsetting of a tipping bucket, the float and bucket being shown in the midway position. Fig. 13 is a similar section to Fig. 11 showing the float and tipping bucket in one of their extreme positions.

1 is the supply pipe which directs the flow of liquid into the chamber 2.

The chamber 2 as shown more particularly in Figs. 5, 6 and 10 is divided by two partitions 3, 3, thus forming four compartments, two of them being referred to hereafter for the sake of clearness as chute chambers and numbered 4, 4, the other two compartments 5, 5, being referred to as the float chambers. As will be seen the partitions 3 extend from the bottom to about the middle of the chamber 2. The chute 6 is fast with the shaft 7 which is mounted in ball bearings 8 on the sides of the chamber 2 as is shown in Fig. 6. The chute has two spouts 9, one of which is directed into one chute chamber 4 and the other spout into the other chute chamber 4. The chute 6 also contains a small tank 10 into which the liquid is directed by the funnel 11 at the end of the supply pipe 1.

12 is a float also fast with the shaft 7 and so shaped that one part projects into one of the float chambers 5, the other part projecting into the other float chamber 5.

At the bottom of each chute chamber 4 are two pipes 13 leading from the chute chamber to the two ends of one of two distributing pipes 14 from which two series of measuring chambers 15 are filled through the pipes 16. The upper part of each pipe 16 contains a rod 17, which partially fills it, thus allowing any gas to escape, while preventing the liquid from splashing out at the top. Each pipe 16 is also provided with a flap valve 18, Fig. 9, to prevent the liquid from surging back from the measuring chamber 15 to the pipe 16 when the displacement plunger 22 is lowered. The bottom of each distributing pipe 14 is sloped so that the middle is at a lower level than the ends, and a cock 19 is provided at the lowest point through which water, grit or other impurity may be drained off. The bottom of each float chamber 5 is connected to the first measuring chamber 15 of its series by the pipe 20.

Each measuring chamber 15 has at the top a neck 21 to receive a displacement plunger 22 (see Fig. 6), and is provided with a siphon 23 to deliver the liquid into a funnel 24 and thence into a can (not shown) which is placed beneath it. Two siphons from a measuring chamber on the right and another from a measuring chamber on the left, lead to each funnel. A sump 151 (see Fig. 6) is provided at the bottom of each measuring chamber and furnished with a plug 152 by which it may be cleaned out.

25 is a small vent pipe projecting from the top of the chamber to allow the escape of gas.

The mechanism for operating the plungers 22 to start the siphons 23 will now be described. Each plunger 22 is connected by a rod 26 to an arm 27 fast with one of two shafts 28 extending along the whole length of the machine one on each side of it. Each rod 26 is screw threaded so that the height of each plunger can be adjusted separately by screwing or unscrewing the nut 29 on the end of the rod 26. By altering the height of a plunger on its rod the capacity of the measuring chamber may be adjusted. At the front end of the shaft 28, Fig. 4, on the right hand side of the machine is an arm 30 fast with the shaft 28; the outer end of the arm 30 is bent upwardly and is provided with a scale 31. Pivoted upon the shaft 28 is a lever 32, the upper end of which projects above the shaft 28 and is bent over at right angles.

The arm 30 is provided with a screwed rod 33 the end of which bears against the end of the lever 32. The lever 32 is provided with a catch 34, which can engage in one of three notches in the rack 35. In Fig. 4 the catch 34 is in the middle notch, that is, the lever is in the neutral position. In order to operate the plungers on the left side of the machine, the lever 32 is connected by a link 36 to a lever 37 loose on the shaft 28 on the left of the machine, which shaft is also provided with an arm 30, a scale 31 and a screwed rod 33. It will be seen that, by moving the lever 32 from the central position, the arms 27 on one shaft 28 together with their plungers 22 are raised while the arms and plungers on the other side of the machine are allowed to drop. By adjusting the screwed rods 33 the height of all the plungers can be adjusted to compensate for changes in the volume of the liquid caused by differences in temperature. The lever 32 is also provided with a link 38 which is connected to toggle levers 39, the upper lever of which is connected to the rod 40 for actuating a valve in the supply pipe 1, the valve being closed in the central position of the lever 32 and opened when the lever 32 is moved to either side.

The operation of the machine is as follows: the parts being in the position shown in the drawings. Liquid entering the machine through the pipe 1 is directed by the funnel 11 into the tank 10 from which it overflows into the chute 6, flowing through the spout 9 on the right hand side of the chute into the chute chamber 4, thence into the pipe 13 to the distributing pipe 14 and from thence into the measuring chambers 15 on the right of the machine. When the liquid has practically filled the measuring chambers, the liquid commences to flow from the first measuring chamber through the pipe 20 to the float chamber 5, raising the float 12, and as soon as the liquid has reached the height indicated by the dotted line 41 (Figs. 5 and 6), the float 12 and with it the chute 6 is tilted and the liquid directed into the chute chamber 4 in connection with the distributing pipe 14 and measuring chambers 15 on the left of the machine, these measuring chambers are similarly filled and the float and chute are tipped back to their original position. As soon as the measuring chambers on one side of the machine are filled and the chute and float have been tipped, the operator by moving the lever 32 rocks the shaft 28, thus depressing the arms 27 and plungers 22, raising the level of the liquid to the height indicated by the dotted line 42 and starting the siphons 23 which empty the liquid contained in each measuring chamber into its funnel 24 and thence into the can placed beneath it.

43 are gage glasses.

In the modification shown in Figs. 11, 12 and 13, instead of mounting the chute 6 and float 12 upon the same shaft as shown in Fig. 6, the chute is pivoted at its upper end at 44 in the chute chamber 4 and the float is pivoted at 45 in the float chamber 5. Fast with the chute is a pin 46 engaging with a slot in a lever 47 carried by the float 12, and two buckets 48, pivoted at 49 one in each chute chamber 4, are connected to the pin 46 by links 50. The float is provided with a T-shaped arm 51 which has in it a slot 52 in which a weight 53 can roll to insure the definite tipping movement of the float from one extreme position to the other.

The operation is as follows:—When the measuring chambers on one side of the machine have been filled that part of the float 12 in the float chamber 5 which is in connection with the filled measuring chamber 15 is raised and tipped over. The chute 6 is swung over by the lever 47 and diverts the liquid into the other chute chamber 4; at the same time the link 50 tips the bucket 48 which discharges its contents into the chute chamber communicating with the filled measuring chambers, the liquid thus tipped out starts the siphons 23 in these measuring chambers.

Although the machine described is stated to be suitable for filling cans, it is to be understood that the term "can" is intended to include bottles or other vessels for containing liquids.

What I claim is:—

1. In a machine for filling vessels, a chamber divided into four compartments, two of said compartments forming float chambers and the other two forming chute chambers, a float, one part of said float being in one float chamber and the other part in the other float chamber, a chute adapted to be moved by the float to deliver liquid alternately into one or other of the chute chambers, a measuring chamber in communication with each chute chamber, a siphon in each measuring chamber, and means for starting the siphons.

2. In a machine for filling vessels, a chamber divided into four compartments, two of said compartments forming float chambers and the other two forming chute chambers, a float, one part of said float being in one float chamber and the other part in the other float chamber, a chute adapted to be moved by the float to deliver liquid alternately into one or other of the chute chambers, two series of measuring chambers each of which is in communication with a chute chamber, a siphon in each measuring chamber, and means for starting all the siphons of one series of measuring chambers simultaneously.

3. In a machine for filling vessels, a chamber divided into four compartments, two of said compartments forming float chambers and the other two forming chute chambers, a float, one part of said float being in one float chamber and the other part in the other float chamber, a chute adapted to be moved by the float to deliver liquid alternately into one or other of the chute chambers, two distributing pipes each of which is in communication with a chute chamber, two series of measuring chambers each of which is in communication with a distributing pipe, a siphon in each measuring chamber, and means for starting all the siphons of one series of measuring chambers simultaneously.

4. In a machine for filling vessels, a chamber divided into four compartments, two of said compartments forming float chambers and the other two forming chute chambers, a float, one part of said float being in one float chamber and the other part in the other float chamber, a chute adapted to be moved by said float to deliver to the two chute chambers alternately, two measuring chambers one of which is connected to one chute chamber and the other to the other, a tipping bucket in each chute chamber, means whereby the bucket in that chute chamber leading to the measuring chamber which is filled is upset when the chute is moved to the other chute chamber and a siphon in each measuring chamber adapted to be started by the rise of liquid due to the upsetting of the bucket.

5. In a machine for filling vessels, a chamber divided into four compartments, two of said compartments forming float chambers and the other two forming chute chambers, a float, one part of said float being in one float chamber and the other part in the other float chamber, a chute adapted to be moved by said float to deliver to the two chute chambers alternately, two distributing pipes each of which is in communication with a chute chamber, two series of measuring chambers each of which is in communication with a distributing pipe, a siphon in each measuring chamber, a tipping bucket in each chute chamber, means whereby the bucket in that chute chamber leading to the series of filled measuring chambers is upset when the chute is moved to the other chute chamber thereby starting the siphons in the filled measuring chambers.

HERBERT AVERAY-JONES.

Witnesses:
 HENRY ERNEST GRIBBLE,
 WALTER JOHN TAYLOR.